(12) United States Patent
Camwell et al.

(10) Patent No.: US 10,408,050 B2
(45) Date of Patent: Sep. 10, 2019

(54) ACOUSTIC RECEIVER FOR USE ON A DRILL STRING

(71) Applicant: Baker Hughes Oilfield Operations LLC, Houston, TX (US)

(72) Inventors: Paul Camwell, Calgary (CA); Douglas S. Drumheller, Cedar Crest, NM (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 14/775,477

(22) PCT Filed: Mar. 10, 2014

(86) PCT No.: PCT/CA2014/050205
§ 371 (c)(1),
(2) Date: Sep. 11, 2015

(87) PCT Pub. No.: WO2014/138963
PCT Pub. Date: Sep. 18, 2014

(65) Prior Publication Data
US 2016/0024913 A1   Jan. 28, 2016

Related U.S. Application Data

(60) Provisional application No. 61/777,790, filed on Mar. 12, 2013.

(51) Int. Cl.
*E21B 47/12* (2012.01)
*E21B 47/16* (2006.01)
(Continued)

(52) U.S. Cl.
CPC ............. *E21B 47/16* (2013.01); *E21B 47/18* (2013.01); *E21B 47/182* (2013.01); *G01V 1/523* (2013.01); *G01V 11/002* (2013.01); *G10K 11/16* (2013.01)

(58) Field of Classification Search
CPC ........ G01V 11/002; G01V 1/46; G01V 1/364; G01V 1/523; E21B 47/12; E21B 47/18;
(Continued)

(56) References Cited

U.S. PATENT DOCUMENTS

| 4,215,425 A | * | 7/1980 | Waggener | ................ E21B 47/12 |
| | | | | 340/855.6 |
| 4,715,451 A | | 12/1987 | Bseisu et al. | |

(Continued)

FOREIGN PATENT DOCUMENTS

| EP | 0565141 A2 | 10/1993 |
| GB | 2249852 A | 5/1992 |
| GB | 2361789 A | 10/2001 |

OTHER PUBLICATIONS

Barnes et al., "Passbands for Acoustic Transmission in an Idealized Drill String," *J. Acoust. Soc. Am.*, 1972, vol. 51:No. 5 (Part 2): 1606-1608.

(Continued)

*Primary Examiner* — Munear T Akki
(74) *Attorney, Agent, or Firm* — Cantor Colburn LLP

(57) ABSTRACT

An acoustic receiver for use on a drill string includes a housing attachable to the drill string; a first sensor mounted within the housing for measuring a first parameter at a first location on the drill string and for generating a first parameter signal representative of the first parameter; a second sensor mounted within the housing for measuring a second parameter at a second location on the drill string and for generating a second parameter signal representative of the second parameter; and a controller mounted within the housing and communicatively coupled to the first and second sensors. The magnitudes of the first and second parameters vary in proportion to magnitude of the acoustic wave and the first and second parameters have a quadrature phase (Continued)

relationship. The controller is configured to combine the first and second parameter signals to determine the magnitude of the acoustic wave.

28 Claims, 7 Drawing Sheets

(51) Int. Cl.
*E21B 47/18* (2012.01)
*G01V 11/00* (2006.01)
*G10K 11/16* (2006.01)
*G01V 1/52* (2006.01)

(58) Field of Classification Search
CPC ...... E21B 47/124; E21B 47/16; E21B 47/182; G10K 11/16; G10K 11/168
USPC ............... 340/855.6, 870.15, 853.1; 367/82; 166/65.1
See application file for complete search history.

(56) References Cited

U.S. PATENT DOCUMENTS

| | | | |
|---|---|---|---|
| 4,992,997 A | | 2/1991 | Bseisu |
| 5,128,901 A | | 7/1992 | Drumheller |
| 5,289,354 A | | 2/1994 | Clayer et al. |
| 5,881,310 A | * | 3/1999 | Airhart ................ E21B 47/124 710/3 |
| 5,969,638 A | * | 10/1999 | Chin ...................... G01V 1/364 166/65.1 |
| 6,791,470 B1 | | 9/2004 | Drumheller |
| 6,956,791 B2 | | 10/2005 | Dopf et al. |
| 7,324,010 B2 | | 1/2008 | Gardner et al. |
| 7,508,734 B2 | | 3/2009 | Fink et al. |
| 8,004,421 B2 | | 8/2011 | Clark |
| 8,437,220 B2 | | 5/2013 | Camwell et al. |
| 2002/0180613 A1 | * | 12/2002 | Shi .......................... E21B 47/18 340/853.1 |
| 2004/0035608 A1 | | 2/2004 | Meehan et al. |
| 2004/0145970 A1 | | 7/2004 | Dopf et al. |
| 2008/0130412 A1 | * | 6/2008 | Fink ..................... G01V 11/002 367/82 |

OTHER PUBLICATIONS

Drumheller, "Acoustical properties of drill strings," *J. Acoust. Soc. Am.*, Mar. 1989, 85: 1048-1064.
Drumheller, "Extensional Stress Waves in One-Dimensional Elastic Waveguides," *J. Acoust. Soc. Am.*, Dec. 1992, 92: 3389-3402.
Drumheller, "Attenuation of sound waves in drill strings," *J. Acoust. Soc. Am.*, Oct. 1993, 94: 2387-2396.
Drumheller et al., "The propagation of sound waves in drill strings," *J. Acoust. Soc. Am.*, Apr. 1995, 97: 2116-2125.
Drumheller, "Wave impedances of drill strings and other periodic media," *J. Acoust. Soc. Am.*, Dec. 2002, 112(6): 2527-2539.
Poletto et al., "Seismic-while-drilling by using dual sensors in drill strings," *Geophysics*, Sep.-Oct. 2004, 69(5): 1261-1271.
International Search Report and Written Opinion of the International Searching Authority, dated Jul. 3, 2014, for corresponding International Application No. PCT/CA2014/050205, 11 pages.
International Preliminary Report on Patentability of the International Searching Authority, dated Jul. 17, 2015, for corresponding International Application No. PCT/CA2014/050205, 15 pages.
Search Report from the European Patent Office for corresponding European Application No. EP14762491.0-1610, Oct. 21, 2016, 8 pages.

\* cited by examiner

ACOUSTIC RECEIVER FOR USE ON A DRILL STRING

CROSS REFERENCE TO RELATED APPLICATIONS

This is the U.S. National Stage of International Application No. PCT/CA2014/050205, filed Mar. 10, 2014, which in turn claims the benefit of and priority to U.S. Provisional Application No. 61/777,790, filed Mar. 12, 2013.

TECHNICAL FIELD

The present disclosure is directed at an acoustic receiver for use on a drill string.

BACKGROUND

It is beneficial in oil and gas drilling to be able to transmit data collected downhole to a surface rig, and to be able to transfer data from the surface rig to a location that is downhole. For example, collecting navigation and other relevant downhole data and transmitting this data to the surface rig is a common practice. This practice is typically referred to as "Measurement-While-Drilling" (MWD). Logging data may also be transmitted uphole, and if so, this practice is referred to as Logging-While-Drilling (LWD). Signals may be transmitted bidirectionally; for example, control signals may be sent from the surface rig to MWD and LWD equipment that is located downhole.

Commercialized MWD and LWD technologies include mud pulse telemetry, in which pressure pulses are generated in and transported through drilling mud by periodically constricting the flow of the drilling mud through a drill string. However, data transmission rates available using mud pulse telemetry are relatively slow (<1 bit/second), which limits the type of data that can be usefully collected. Wireline telemetry has also been used, and it provides greater data throughput than mud pulse telemetry, but electric cables that are used to transmit data up and down the drill string are vulnerable to damage and impose limitations on the operation of the drill string.

Wireless telemetry technology other than mud pulse telemetry technology has been developed that avoids the physical limitations of wireline cables and has a higher data transmission rate than mud pulse telemetry. An example of wireless telemetry other than mud pulse telemetry is electromagnetic telemetry, in which signals are sent as electromagnetic waves through the earth. Electromagnetic telemetry is limited to operating in areas where formation resistivity is in an acceptable range that permits signal transmission.

Another type of wireless telemetry is acoustic telemetry, which involves transmitting data as acoustic waves via media such as drill pipe. Several technical challenges exist when attempting to communicate using acoustic telemetry; for example, when performing MWD or LWD using acoustic telemetry, one challenge is ensuring that an above-surface receiver receives acoustic waves of sufficient amplitude and quality.

Given the continued need for transmitting data collected downhole to a surface rig, and for transferring data from the surface rig to a location that is downhole, research and development accordingly continue into methods, systems, and techniques for transmitting data during drilling.

SUMMARY

According to a first aspect, there is provided a method for measuring an acoustic wave propagating along a drill string, the method comprising measuring a first parameter of the drill string at a first location along the drill string; measuring a second parameter of the drill string at a second location along the drill string, wherein magnitudes of the first and second parameters vary in proportion to magnitude of the acoustic wave and wherein the first and second parameters have a quadrature phase relationship; and determining the magnitude of the acoustic wave from one or both of the first and second parameters.

The first and second locations may share a common axial position along the drill string.

The first and second locations may be separated by a distance other than $n \cdot (\lambda/4)$, where n is an odd integer.

A combination of the first and second parameters may be used to determine the magnitude of the acoustic wave.

The first parameter may be axial acceleration and the second parameter may be axial strain.

A piezoelectric transducer may be used to measure the strain.

Measuring the strain may generate a strain signal, and the method may further comprise amplifying the strain signal prior to determining the magnitude of the acoustic wave.

Measuring the acceleration may generate an acceleration signal, and the method may further comprise amplifying the acceleration signal prior to determining the magnitude of the acoustic wave.

The method may further comprise conditioning and digitizing the strain and acceleration signals prior to determining the magnitude of the acoustic wave.

Determining the magnitude of the acoustic wave may comprise summing the strain and acceleration signals.

The method may further comprise, prior to summing the strain and acceleration signals, sweeping the signals relative to each other and determining a phase difference between the signals at which a sum of the signals is maximized; and shifting the signals together by the phase difference.

The acoustic wave may be an overall acoustic wave comprising a superposition of an upward traveling wave and a downward traveling wave.

The method may further comprise determining current acceleration of the upward traveling wave by summing a linear combination of the accelerometer signal sampled at time t and the strain signal sampled at time t−T/4, where T is the period of the acoustic wave.

The method may further comprise determining current acceleration of the upward traveling wave by subtracting a linear combination of the accelerometer signal sampled at time t and the strain signal sampled at time t−T/4, where is the period of the acoustic wave.

The first and second locations may be located within a downhole telemetry node.

According to another aspect, there is provided an acoustic receiver for use on a drill string, the receiver comprising a housing attachable to the drill string; a first sensor mounted within the housing for measuring a first parameter at a first location on the drill string and for generating a first parameter signal representative of the first parameter; a second sensor mounted within the housing for measuring a second parameter at a second location on the drill string and for generating a second parameter signal representative of the second parameter, wherein magnitudes of the first and second parameters vary in proportion to magnitude of the acoustic wave and wherein the first and second parameters have a quadrature phase relationship; and a controller mounted within the housing and communicatively coupled to the first and second sensors, the controller configured to combine the first and second parameter signals to determine the magnitude of the acoustic wave.

The first and second locations may share a common axial position along the drill string.

The first and second locations may be separated by a distance other than n·(λ/4), where n is an odd integer.

The controller may be configured to use a combination of the first and second parameters is used to determine the magnitude of the acoustic wave.

The first parameter may be axial acceleration and the second parameter may be axial strain.

The second sensor may comprise a piezoelectric transducer.

Measuring the strain may generate a strain signal, and the receiver may further comprise a strain amplifier, communicative with the controller and the piezoelectric transducer, to amplify the strain signal.

Measuring the acceleration may generate an acceleration signal, and the receiver may further comprise an acoustic amplifier, communicative with the controller and the accelerometer, to amplify the acceleration signal.

The receiver may further comprise signal conditioning circuitry, communicative with the amplifiers and the controller, to condition and digitize the strain and acceleration signals.

Determining the magnitude of the acoustic wave may comprise summing the strain and acceleration signals.

The controller may be configured, prior to summing the strain and acceleration signals, to sweep the signals relative to each other and determining a phase difference between the signals at which a sum of the signals is maximized; and shift the signals together by the phase difference.

The acoustic wave may be an overall acoustic wave comprising a superposition of an upward traveling wave and a downward traveling wave.

The controller may be configured to determine current acceleration of the upward traveling wave by summing a linear combination of the accelerometer signal sampled at time t and the strain signal sampled at time t−T/4, where T is the period of the acoustic wave.

The controller may be configured to determine current acceleration of the upward traveling wave by subtracting a linear combination of the accelerometer signal sampled at time t and the strain signal sampled at time t−T/4, where T is the period of the acoustic wave.

The housing may comprise threaded ends that can be screwed into the drill string for use as a downhole telemetry node.

According to another aspect, there is provided a non-transitory computer readable medium having encoded thereon statements and instructions to cause a controller to perform any of the foregoing methods.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments.

DETAILED DESCRIPTION

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment.

Figure 1:
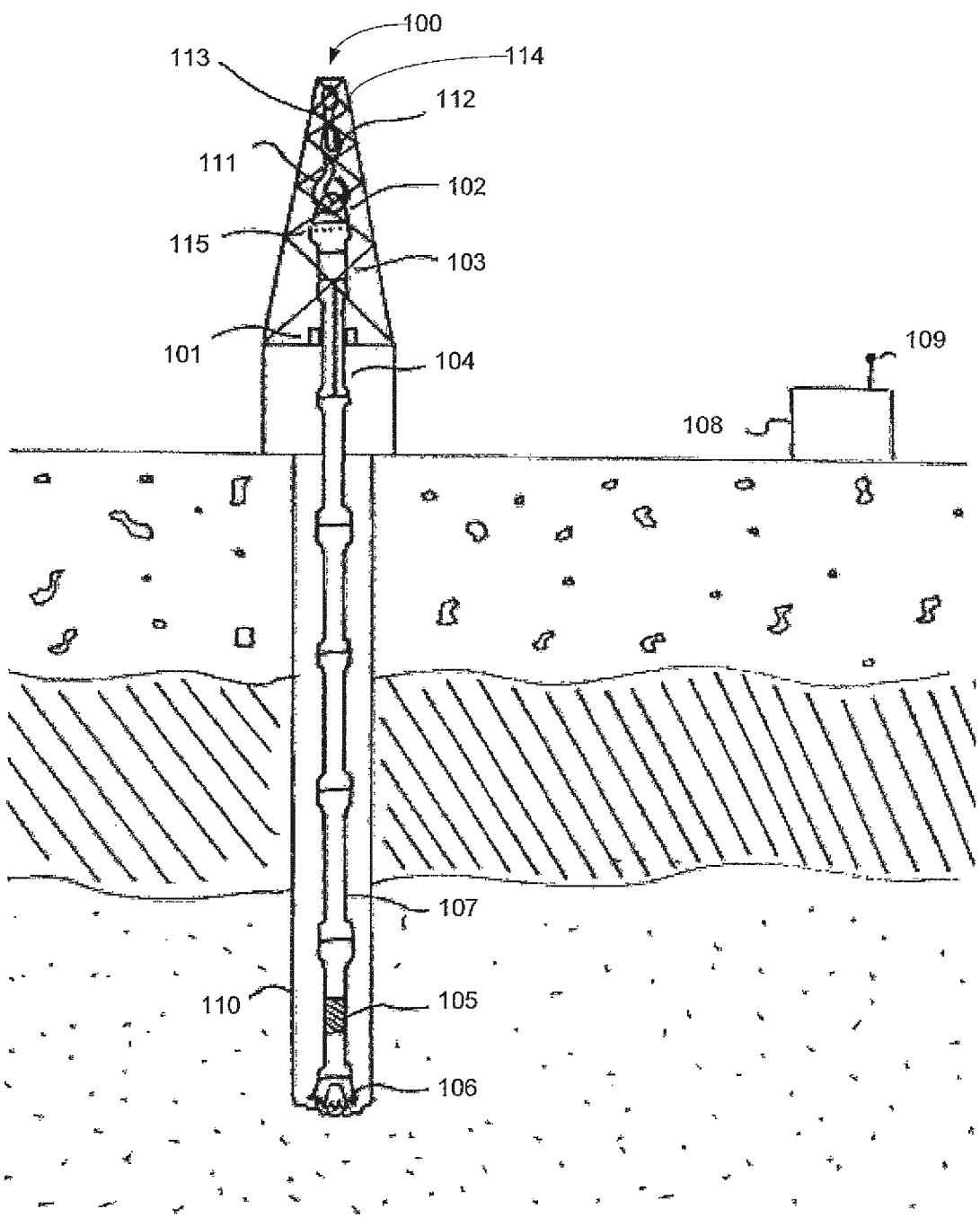
FIG. 1 shows a schematic of a drilling rig and drill string (PRIOR ART).

During oil and gas drilling, acoustic telemetry can be used to communicate bidirectionally between the surface and a downhole location. Referring now to FIG. 1, there is shown a schematic of a drilling rig 100 that is used to drill a wellbore 110 and that includes components that allow MWD to be performed. The drilling Jig 100 includes a derrick 114 on to which are mounted a cable assembly 113, traveling blocks 112 that the cable assembly 113 lifts and lowers, and a hook 111 that the traveling blocks 112 carry. The hook 111 is inserted through a bail 102 that is connected to a swivel joint. 115, which is made of steel and into which is screwed one end of a saver sub 103. One end of a kelly 104 is screwed into the other end of the saver sub 103, and a rotary table 101 is located between the kelly 104 and the saver sub 103. Extending from the other end of the kelly 104 are segments of drill pipe 107, which are threadably coupled together as desired to lengthen or shorten the drill string. The kelly 104 is raised to enable insertion of a drill pipe 107 into the string. As the drilling proceeds, the travelling blocks 112 lower the assembly 113 until the kelly 104 has been lowered to its maximum extent. The kelly 104 is then raised until the topmost drill pipe 107 is just above the rig floor, thus allowing the kelly 104 and drill pipe 107 to be disconnected and another segment of drill pipe 107 to be inserted into the drill string, and the drilling procedure continued. This raising/lowering procedure implies that it is impractical to attach any equipment external to the tubulars unless there is an available section of pipe 107 that always stays above the rig floor and also does not interfere with surface pipe-handling equipment. Such a space is not designed into typical rigs 100; any space that is available is incidental to the design of the rig 100 and spans typically 10 to 15 inches (25.4 to 38.1 cm) at most.

At the bottom of the drill string is a bottomhole assembly, which typically includes an MWD tool 105 and a drill hit 106. In the depicted embodiment, the "drill string" includes the saver sub 103, the kelly 104, the segments of drill pipe 107, the MWD tool 105, and the drill hit 106, although in other embodiments the drill string may include different components. The MWD tool 105 contains sensors to acquire data relevant to the drilling process, such as data describing formation geology, fluid pressure, and wellbore geometry, and in one specific embodiment an acoustic transmitter that is used to send messages via acoustic telemetry to the surface. The acoustic transmitter generates acoustic waves that propagate along the drill string to the surface. At the surface, an acoustic receiver (not shown in FIG. 1) that is located along the drill string receives and conveys these acoustic waves wirelessly to a safe area monitoring system 108 for further processing and analysis. The receiver may, for example, be mounted on to the saver sub 103 and be as described in U.S. Pat. No. 6,956,791 assigned to XACT™ Downhole Telemetry Inc., the entirety of which is hereby incorporated by reference. A conventional acoustic receiver measures axial acceleration of the drill string at a location on the drill string and uses axial acceleration as representative of the acoustic wave; however, as discussed in more detail below, in the embodiments described herein parameters aside from axial acceleration may also be measured and presumed to be representative of the acoustic wave.

Figure 2:
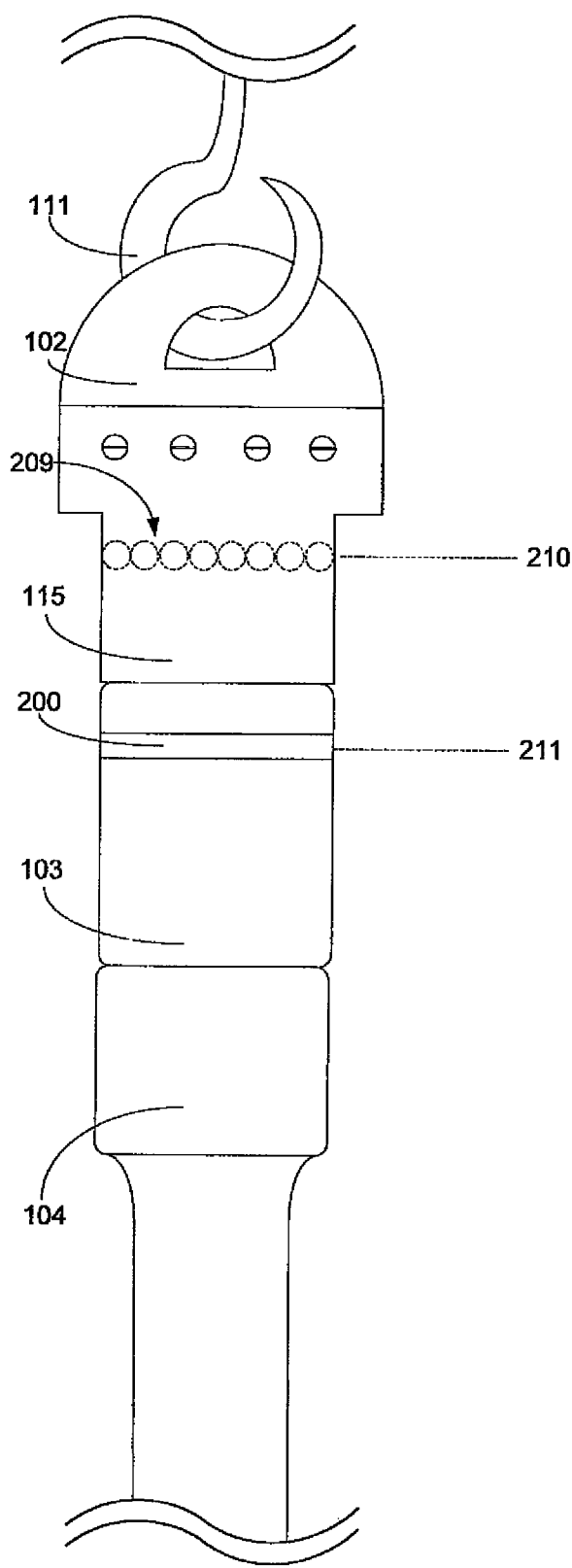
FIG. 2 is an enlarged view of a portion of a drill string showing an acoustic receiver mounted to the drill string, according to one embodiment.

Referring now to FIG. 2, there is shown an enlarged view of the hook 111, bail 102, swivel joint 115, saver sub 103, and kelly 104. Mounted on to the saver sub 103 is an acoustic receiver 200 according to one embodiment. In the depicted embodiment, the acoustic receiver 200 includes a clamping assembly as described in U.S. Pat. No. 6,956,791 that allows it to be clamped to the exterior of the saver sub 103; however, in alternative embodiments (not depicted), the acoustic receiver 200 may be attached to the drill string differently, such as by being incorporated into a sub and then screwed into the drill string, by being incorporated into a package for use in a downhole tool that forms part of the drill string, or by being integrated with a surface pipe, such as a quill of a drill string. Shown in dashed lines in FIG. 2 are bearings 209 that are housed within the swivel joint 115. These bearings 209 also incorporate a seal (not shown) between upper and lower parts of the swivel joint 115, their purpose being to enable the lower section of the swivel joint 115 to rotate, thereby also enabling the lower section of the drill string to rotate. The section of swivel joint 115 above the bearings 209 does not rotate, thus allowing drilling fluid to enter the drill string from a non-rotating flexible tube, with the seal confining the fluid to the appropriate tubulars. The portion of the swivel joint 115 that incorporates the bearings 209 and seals effectively forms an axial mechanical discontinuity. From the perspective of an upward-travelling acoustic wave the discontinuity results in the rotating section of the swivel joint 115 below the bearings 209 and seals having characteristics similar to that of an open-ended pipe. A sinusoidal acoustic wave encountering this discontinuity can be modeled as reflecting from the open end due to a significant acoustic impedance (Z) change—from relatively high to relatively low. In an alternative embodiment (not depicted), the upward traveling wave 202 reflects off significant acoustic discontinuities of a top drive instead of the swivel joint 115.

In this context the generalized acoustic impedance Z is given by the following:

$$Z=\rho c A \quad (1)$$

In Equation 1 ρ is the density of the material through which the acoustic wave propagates, which in the exemplary embodiments is steel; c is the axial wave speed of the acoustic wave in steel and A is the cross sectional area of the steel.

Figure 3:
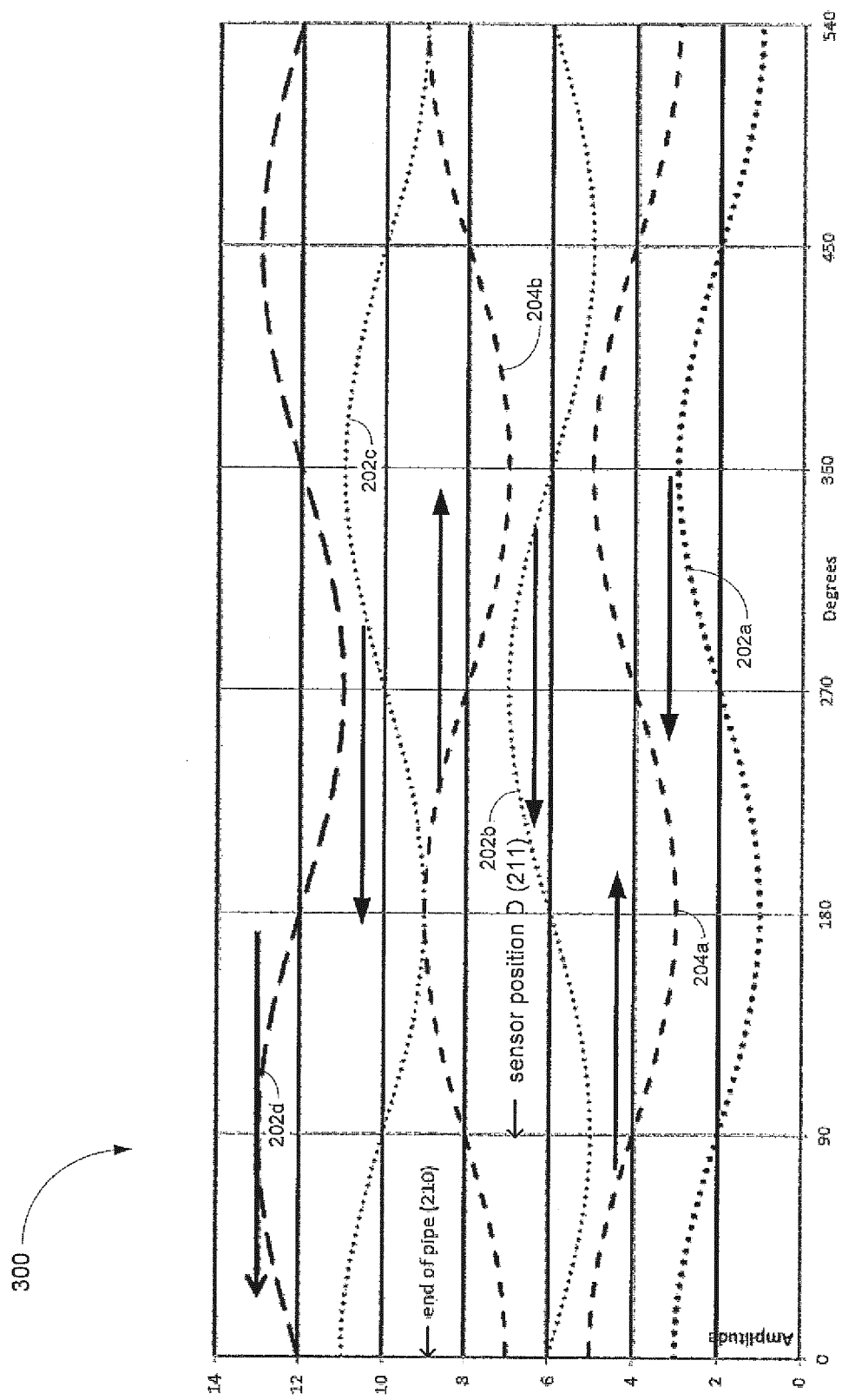
FIG. 3 shows various upward and downward acoustic waves traveling along the drill string of FIG. 2 at various times.

Referring now to FIG. 3, there are depicted a number of acoustic waves that may be propagating up and down the drill string at any given time. The acoustic waves are measured simultaneously by a single sensor at a fixed axial position along the drill string, such as an accelerometer strapped to the drill string. The acoustic waves include upward travelling cyclic waves 202 of frequency f and wavelength λ and similar downward travelling waves 204 (hereinafter "upwaves 202" and "downwaves 204", respectively). Consider first the upwave 202a encountering the discontinuity at the position 210 of the bearings 209 ("bearing position 210"). At a certain point in time $t_0$ the upwave 202a arrives as shown at the bearing position 210 with an amplitude of −1; for convenience this is shown as zero degrees phase (0°) in FIG. 3. Because the acoustic discontinuity at the bearing position 210 is assumed to be implemented by a perfect open pipe, the phase and amplitude of the reflected downwave 204a is identical to that of the upwave 202a. They can be modeled identically, apart from their direction of propagation. From the superposition principle, the net amplitude as measured in time at the bearing position 210 will be twice that of either the upwave 202a or the downwave 204a.

Now consider a similar situation but place the sensor at a fixed position below the bearing position 210, and relate wavelength λ, to frequency f via Equation 2:

$$c=\lambda f \quad (2)$$

The situation in which the upwave 202a and downwave 204a are measured at a particular position axially below the bearing position 210 is now considered; for reference this position is referred to as being at a distance 211 (hereinafter "D 211") from the bearing position 210. A time is chosen when the upwave 202b is at −1 amplitude at D 211. Further, D 211 is chosen to be one quarter of the acoustic wavelength λ, i.e. a difference in phase of 90° with respect to the upwave 202a. Following the progression of this upwave 202h in time and distance, we see that it travels a distance λ/4 to the bearing position 210 in time $t_4$ as given by Equation 3:

$$t_4=(\lambda/4)/c \quad (3)$$

It then reflects from the bearing position 210, becoming downwave 204h. Assuming that there is negligible signal amplitude attenuation over these relatively short distances the upwave 202b and downwave 204h will have the same amplitudes. The downwave 204b now takes an equal amount of time $t_4$ to travel back distance d=λ/4, the round trip distance travelled being therefore λ/2, and its amplitude upon arrival will be −1. Application of Equation 3 shows that in the time 2·$t_4$ that it takes the downwave 204b to return, the original upwave 202b will have changed phase by 180°; this is depicted as upwave 202c in FIG. 3, which is 180° out of phase relative to the downwave 204b. Phase and amplitude considerations are arbitrary: a round-trip distance of λ/2 will yield a relative phase change of 180° between upwave and downwave, thereby causing an amplitude null at a position λ/4 below a substantially open pipe (low impedance) discontinuity, such as the discontinuity at the bearing position 210. As the sensing accelerometer simply adds waves 204b and 202c independent of their directionality, the accelerometer measures a summed amplitude of zero. Thus if one were unfortunate enough to be constrained to measure the acoustic signals at position D 211 on the drill string of the rig 100, the measured acoustic amplitude would always be zero despite there being otherwise measurable acoustic cyclic signals traveling along the drill string.

Position D 211 is not unique: the same cancellation will occur at 3λ/4, 5λ/4 etc. below the bearing position 210, assuming no significant signal attenuation and an ideal situation in which the only acoustic reflection occurs at the bearing position 210. Analogously, double amplitude measurements would occur at 0λ/4, 2λ/4, 4λ/4 etc. Thus, using an accelerometer to obtain a measurement at an arbitrary position is likely to yield a measurement somewhere between these repeated extremes. In one embodiment, acoustic waves are transmitted at a frequency of approximately 640 Hz because of acoustic passband issues as referenced in U.S. Pat. No. 6,791,470, the entirety of which is incorporated by reference herein. The wavelengths of the acoustic signal is accordingly approximately 8 m, thereby being subject to axial signal extinctions approximately every 2 m. In practice the sensor position is physically constrained by the rig design, making optimal positioning for signal detection purposes a matter of luck.

In summary we have an acoustic wave detection situation in which, because of reflections, amplitude detection can vary from 2× amplitude to zero amplitude over spatial periods of λ/4, the constraint being determined by the detection position being available on a rig.

Accordingly, a position-independent acoustic receiver would be a significant improvement over conventional acoustic sensors. The depicted embodiments accordingly utilize another type of sensor in conjunction with an accelerometer at the same axial position as the accelerometer. What would serve is a sensor that achieves maximum output when the accelerometer provides minimum output. This is equivalent to requiring the second sensor to provide an output that is shifted in phase by 90° from the accelerometer; i.e., a second sensor that provides an output that has a quadrature phase relationship with the output from the accelerometer.

Such a phase shifted signal, signal 202d, is depicted in FIG. 3. Comparing 202c and 202d, we see that when one is at an absolute maximum (+/−1 amplitude) the other is at a minimum (zero amplitude). Therefore if the detector position was at position 211, from the foregoing we would expect that the net accelerometer output was always zero and the new sensor always provided a doubled output. This situation would reverse if the sensor position was at the bearing position 210. It would be reasonable to choose to switch between one or the other sensor, depending on which provided the best signal output, depending on receiver position on the drill string.

To determine the type of she second sensor, consider that as a sinusoidal extensional wave travels along drill pipe 107, on to the belly 104 and hence to the saver sub 103 the travelling wave acts upon the tubular's material alternately causing a compression and rarefaction of the material in an axial direction. The particles making up the tubulars thereby sinusoidally oscillate in an axial direction, driven by the energy of the passing wave. A particle at the bearing position 210 would experience a doubling of its motion compared to particles substantially below it, because one side is essentially unconstrained. This doubling also applies to the velocity and the acceleration of the particle. Thus measuring acceleration at the bearing position 210 is equivalent to measuring the signal energy of the acoustic signal in the pipe. But as we have seen, the motion of a particle at an odd number of quarter wavelengths below the bearing position 210 is zero due to reflections causing destructive interference. However, if one were to measure the stress one would find it was maximized at such positions. Further, the stress at the bearing position 210 would be zero, basically because there are no axial constraints at such a position. We define stress a in an axial direction as the ratio of that material's unit change of length divided by the unit length. As is well known in material science, Young's modulus E is given by:

$$E = \sigma/\varepsilon \quad (4)$$

where ε is defined as the ratio of Force divided by area, i.e. strain.

Because in steel E is substantially constant, measuring stress is equivalent to measuring strain. Thus a strain gauge would have the properties we desire in that its output would be in phase quadrature (i.e. its output would look similar to that of an accelerometer at the same position but would be shifted by 90°). Practical considerations would include the strain gauge output being commensurate with that of the accelerometer, which may be achieved with signal conditioning circuits such as electronic amplifiers and filters.

Figure 4:
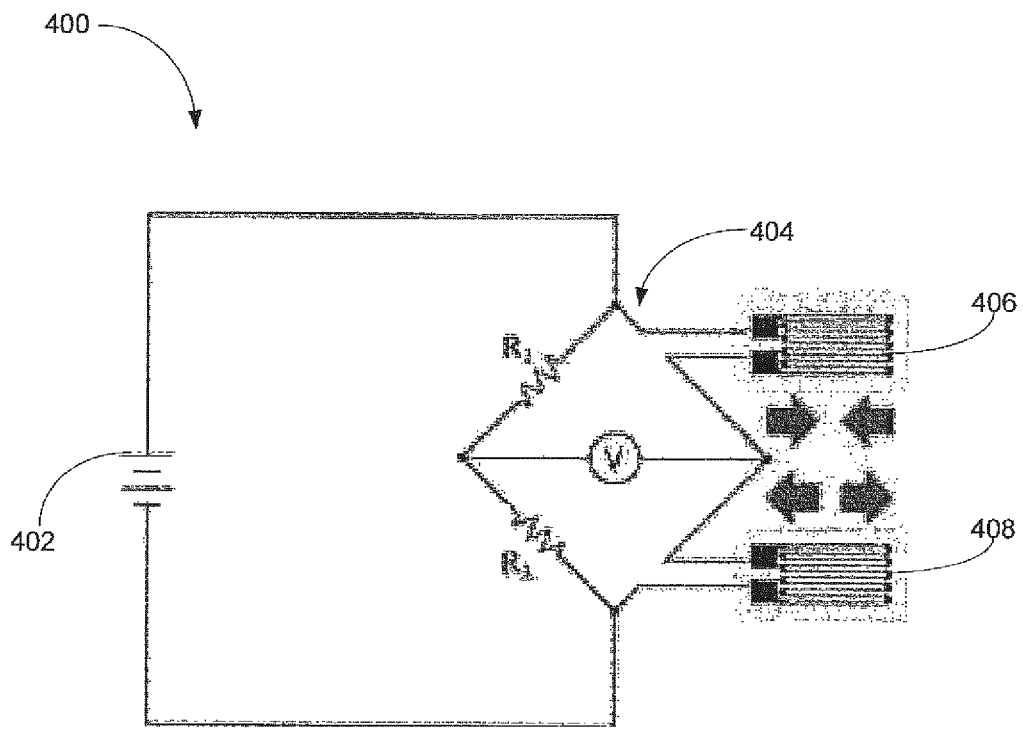
FIGS. 4 and 5 depict two different embodiments of strain gauges that may be used in the acoustic receiver of FIG. 2.

FIG. 4 shows a typical strain gauge circuit in a Wheatstone bridge deployment 404 whereby mechanical motion of two strain gauges 406, 408 modifies the bridge electrical output when powered by a battery 402, for instance. One could expect changes of output voltage on the order of a few microvolts when the source 402 is, for example, a 9 volt battery in the acoustic telemetry environment of the depicted embodiments. The strain gauge circuit of FIG. 4 may be used in one embodiment a strain gauge sensor 400 (hereinafter simply "strain gauge 400"). While FIG. 4 shows a half-bridge strain gauge circuit, alternative embodiments (not depicted) include full and quarter-bridge strain gauge circuits. A typical modern accelerometer (such as built by Wilcoxon™) could easily provide hundreds of millivolts under the same circumstances.

Figure 5:
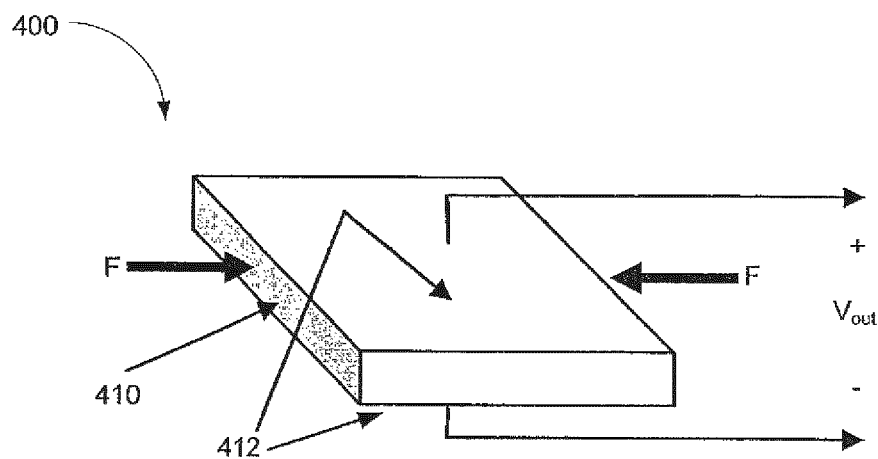

FIG. 4 indicates that a relevant application to our signal detection requirements could be met by modification of the strain gauge technique just described. Consider a material 410 such as PZT (lead zirconate titanate) between two conductive plates 412, such as copper. If the PZT is polarized appropriately, a force F in the plane of the plates 412 will cause a voltage change $V_{out}$, proportional to the size of the Force F. Because a force is required to stress such a device, which is shown in FIG. 5, the device acts as a strain gauge 400. The response of the strain gauge 400 of FIG. 5 to a given force can be increased by increasing the surface area as defined by conducting plates 412. In one exemplary embodiment, the conducting plates 412 have dimensions of approximately 2"×2"×(5.08 cm×5.08 cm×0.254 cm).

Figure 6:
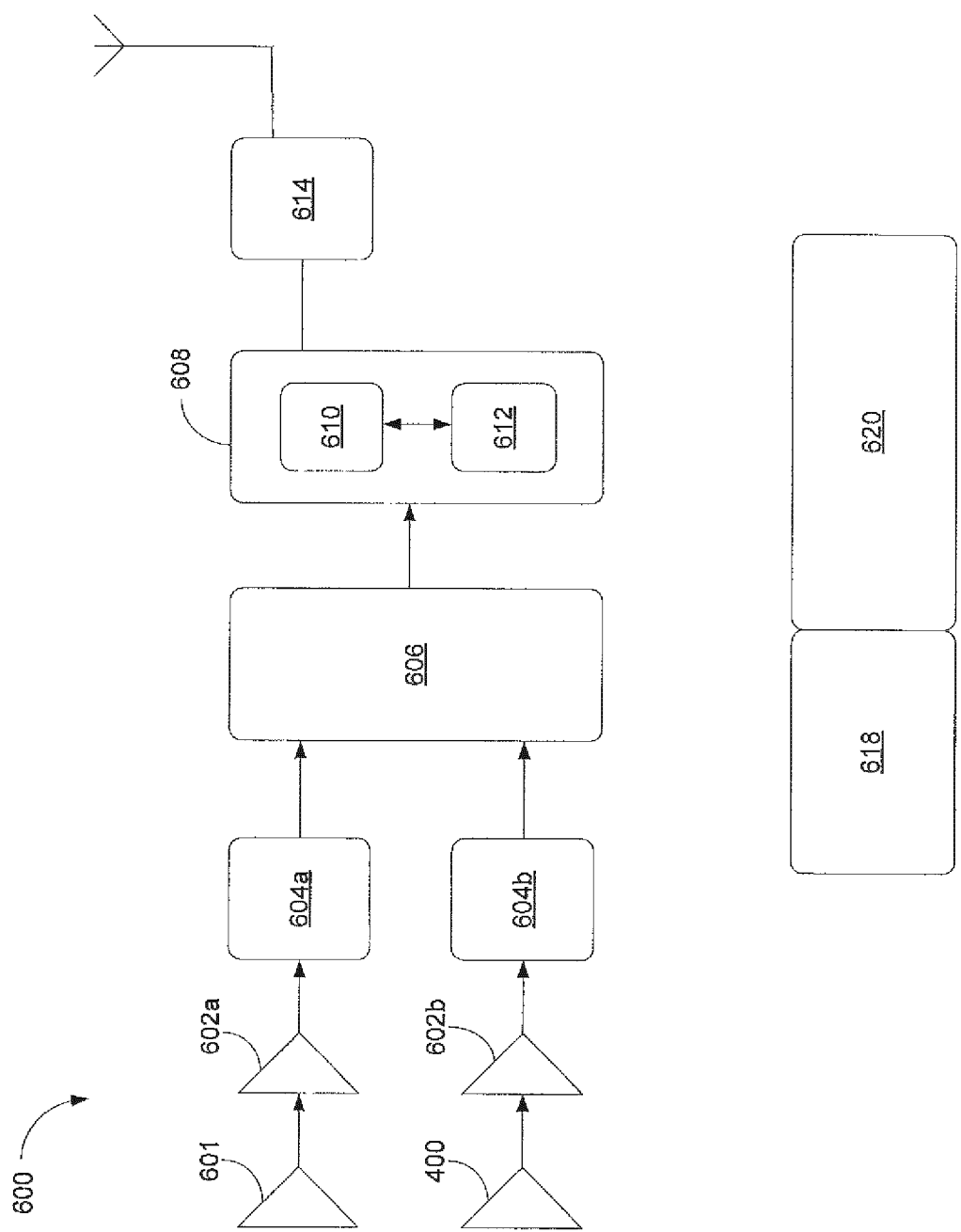
FIG. 6 is a block diagram of electrical circuitry used in the acoustic receiver of FIG. 2.

FIG. 6 shows a typical electronic circuit 600 where we now provide two-channel amplification for the accelerometer 601 and strain gauge 400 (via amplifiers 602a and 602b, respectively), conditioning and filtering (via conditioning and filtering circuitry 604a and 604b, respectively) before digitizing the signals using an A/D converter 606 and sending them on to a controller 608. The controller 608 includes a processor 610 and a computer readable medium in the form of non-volatile and volatile memories (collectively, "memory 612") that are communicatively coupled to the processor 610 and have encoded thereon statements and instructions to cause the processor 610, and consequently the controller 608, to determine the magnitude of the acoustic wave using any one or more of the methods described below. After determining the magnitude of the acoustic wave, the controller 608 sends this information as a wireless signal to the sale area monitoring system 108 via a wireless transmitter 614 for one or both of further processing and display. The circuitry 600 also includes batteries 620 and power supply circuitry 618, which powers the remainder of the circuitry 600 in the receiver 200.

Figure 7:
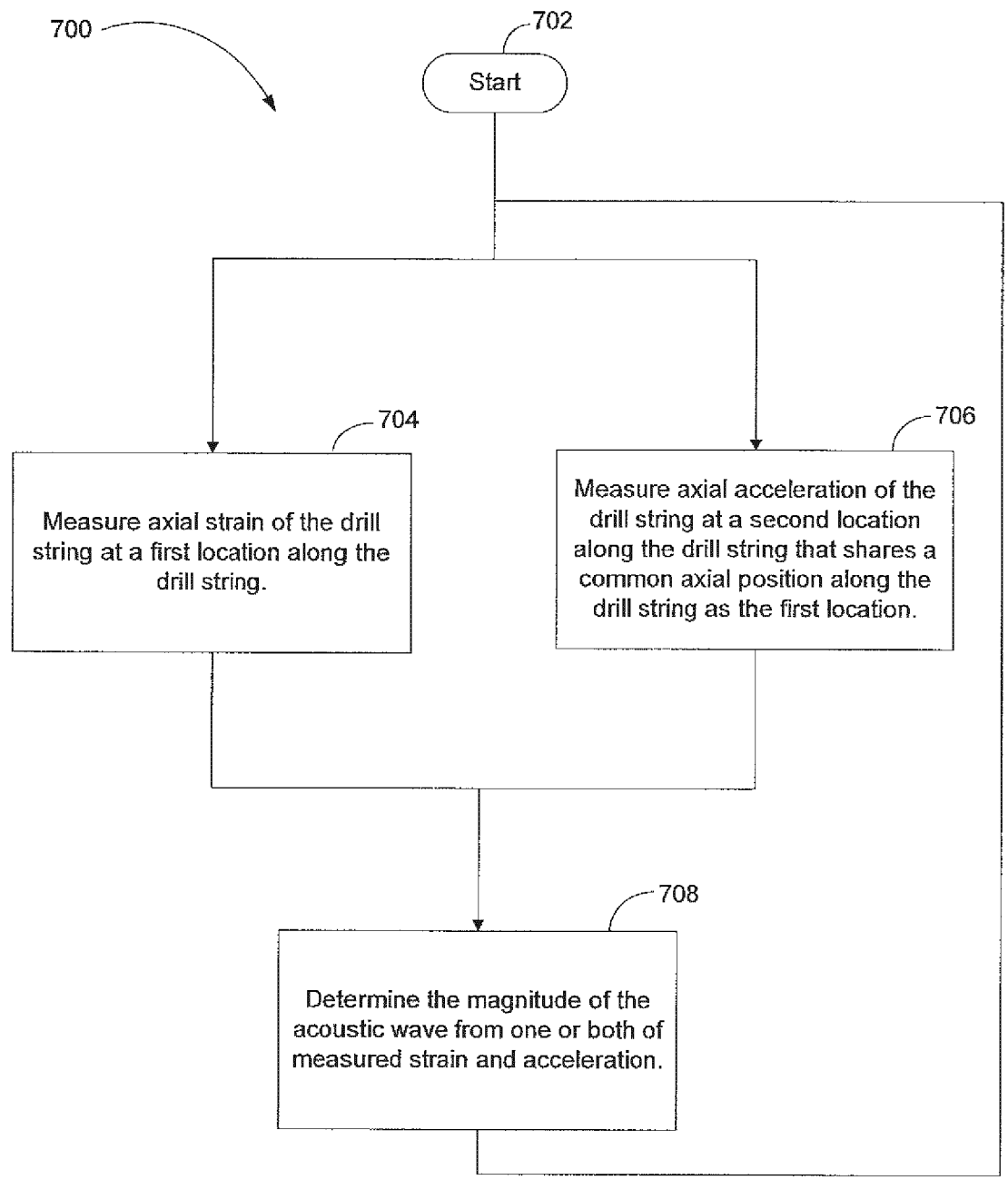
FIGS. 7 and 8 are flowcharts depicting a method for determining the magnitude of an acoustic wave propagating along the drill string, according to additional embodiments.

Referring now to FIG. 7, there is shown a method 700 for measuring the acoustic wave, according to another embodiment. As mentioned above, in the depicted embodiments, the controller 608 performs the method 700. However, in alternative embodiments (not depicted), the method 700 may be performed by, for example, the safe area monitoring system 108, or performance of the method 700 may be distributed, with the controller 608 performing some aspects of the method 700 and the safe area monitoring system 108 performing the remaining aspects of the method 700.

The controller 608 begins performing the method 700 at block 702, following which it proceeds to blocks 704 and 706. At block 704, the controller 608 uses the strain gauge 400 to measure axial strain of the drill string at a first location on the drill string. At block 706, the controller 608 uses the accelerometer 601 to measure axial acceleration at a second location along that drill string that shares a common axial position as the First location. The strain gauge 400 and the accelerometer 601 may, for example, be coincident on the drill string. Alternatively, the strain gauge 400 and the accelerometer 601 may be at different positions on the drill string's circumference, but nonetheless be at the same axial position along the drill string. While FIG. 7 shows blocks 704 and 706 being performed in parallel, in an alternative embodiment (not shown) they may be performed in series.

As discussed above in respect of FIG. 6, the strain gauge 400 and accelerometer 601 respectively output the strain and acceleration signals, which are amplified, conditioned, digitized, and then further processed by the controller 608. After blocks 704 and 706, at block 708 the controller 608 determines the magnitude of the acoustic wave from one or both of the strain and acceleration signals. As mentioned above, if the acceleration signal is nearly zero, the controller 608 may use the strain signal; analogously, if the strain signal is nearly zero, the controller 608 may use the acceleration signal. In the depicted embodiment, the controller 608 may combine the signals by normalizing and then summing them together, and using the summed signals as being representative of the magnitude of the acoustic wave.

In addition to determining the overall magnitude of the acoustic wave, which is the result of the superposition of the upwaves 202 and downwaves 204, the controller 608 may also distinguish between the upwaves 202 and downwaves 204 and determine the magnitude of either of them.

Following the phases and amplitudes of the upwaves 202 and downwaves 204 can be performed in a visual manner as depicted in and described in reference to FIG. 3. Alternatively, these phases and amplitudes may be determined using the equations below.

To demonstrate this, consider the following d'Alembert solution for material displacement u along the drill string, where x represents axial displacement along the drill string, t is time, $B_D$ and $B_U$ are amplitudes of the downwave 204 and upwave 202, respectively, angular frequency $\omega$ is $2\pi f$ and c is the wave velocity in steel.

$$(x,t) = B_U \exp i\omega(t-x/c) + B_D \exp i\omega(t+x/c) \quad (5)$$

The first and second expressions on the right side of Equation (5) represent the upwaves 202 and downwaves 204, respectively. The intent here is to devise a scheme for measuring these two expressions separately.

Because the acoustic receiver 200 is a combination of the strain gauge 400 and the accelerometer 601, the modified expressions for strain $$\in = \frac{\partial u}{\partial x}$$

and acceleration $$\alpha = \frac{\partial^2 u}{\partial t^2}$$

are evaluated below:

$$c \in (x,t) = -i\omega B_U \exp i\omega(t-x/c) + i\omega B_D \exp i\omega(t+x/c) \quad (6)$$

$$\alpha(x,t) = -\omega^2 B_U \exp i\omega(t-x/c) - \omega^2 B_D \exp i\omega(t+x/c) \quad (7)$$

Noting that the complex number i obeys the relationship:

$$i = \exp\left(\frac{i\pi}{2}\right) \quad (8)$$

and substituting i into Equation (6) results in:

$$c \in (x,t) = -\omega B_U \exp i\omega\left(t - x/c + \frac{\pi}{2\omega}\right) + \omega B_D \exp i\omega\left(t + x/c + \frac{\pi}{2\omega}\right) \quad (9)$$

Using the known relationship between time period $\tau$ and $\omega$ results in:

$$c \in (x,t) = -\omega B_U \exp i\omega\left(t - x/c + \frac{\tau}{4}\right) + \omega B_D \exp i\omega\left(t + x/c + \frac{\tau}{4}\right) \quad (10)$$

t can then be replaced with t−τ/4 to obtain:

$$c \in (x, t-\tau/4) = -\omega B_U \exp i\omega(t-x/c) + \omega B_D \exp i\omega(t+x/c) \quad (11)$$

This result is multiplied by $\omega$ and added to Equation (7) to obtain $$-2\omega^2 B_U \exp i\omega(t-x/c) = \alpha(x,t) + wc \in \left(x, t - \frac{\tau}{4}\right) \quad (12)$$

and subtraction yields:

$$-2\omega^2 B_D \exp i\omega(t+x/c) = \alpha(x,t) - wc \in \left(x, t - \frac{\tau}{4}\right) \quad (13)$$

Let $x = x_1$ denote the axial location of the acoustic receiver 200.

From Equation (7) the acceleration of the upwaves 202 and downwaves 204 that pass location x are:

$$\alpha_U(t) = -\omega^2 B_U \exp i\omega(t-x_1-c) \quad (14)$$

$$\alpha_D(t) = -\omega^2 B_D \exp i\omega(t+x_1/c) \quad (15)$$

The acceleration and strain signals are:

$$S_\alpha(t) = \alpha(x,t) \quad (16)$$

$$S_\in(t) = \in(x,t) \quad (17)$$

From Equations (12) and (13):

$$\alpha_U(t) = \frac{1}{2}\left[S_\alpha(t) + \omega c S_\in\left(t - \frac{\tau}{4}\right)\right] \quad (18)$$

$$\alpha_D(t) = \frac{1}{2}\left[S_\alpha(t) + \omega c S_\in\left(t - \frac{\tau}{4}\right)\right] \quad (19)$$

Note that $\omega$ does not imply that this analysis is appropriate at only a single frequency; by suitable bandpass amplifiers and filters one can use these formulas to detect telemetry signals over a passband supported by the drill string.

In the equations above, positive acceleration is upwards, the positive x direction, and positive strain results in tension along the drill string. Furthermore, and as discussed in more detail below, using Equations 18 and 19 the controller 608 can determine the current values of the axial acceleration of the drill string caused by the upwaves 202 and downwaves 204 from a current version of the accelerometer signal and a version of the strain signal shifted forward in phase by 90°.

By summing the signed, scaled and phased accelerometer and strain gauge signals one can detect an upward travelling acoustic sinusoidal extensional telemetry signal (an upwave 202) in drill pipe, ignoring any downward signal (a downwave 204), and vice versa (by simply changing the of the strain gauge sensor contribution, effected by a phase shift). It has been shown that this can be accomplished by two axially co-located sensors with the specific phase features as discussed. To those skilled in the art, this unexpected result enables embodiments of the receiver 200 employing the principles elucidated herein to provide an output that is substantially independent of position along the surface pipe available on a drilling rig. This is primarily because signal cancellation from a single sensor due to deleterious reflections can be avoided by combining, in one embodiment, a co-located "quadrature" sensor with an "in-phase" sensor in the receiver 200. In brief, being able to detect either upward-only signals or downward-only signals in such a hybrid receiver 200 provides one exemplary means of avoiding the position-dependent cancellation aspect of single sensor detectors.

Such a hybrid receiver 200 employs a novel form of "antenna diversity". Thus one can summarize the hybrid receiver 200 capability as follows:
  (a) if the detector happens to be located on a pipe at a distance from an open end where the distance is given by $n \cdot \lambda / 4$, n being an odd integer, a single sensor that is in-phase with the material displacement of the pipe (such as an accelerometer) is all that is necessary for optimum detection.
  (b) If the detector happens to be located on a pipe at a distance from an open end where the distance is given by $n \cdot \lambda / 4$, n being an even integer, a single sensor that is out-of-phase with the material displacement of the pipe (such as a strain gauge) is all that is necessary for optimum detection.
  (c) If the detector happens to be located on a pipe at an arbitrary distance from an open end where the distance is given not given an odd or even multiple of $\lambda/4$, optimum detection can be effected but a suitable summation of two sensors, their relative phase output being in phase quadrature (such as a combination of accelerometer and strain gauge).
  (d) The best operational choice of sensor, dependent on position, can be:
    (i) accelerometer alone;
    (ii) strain gauge alone;
    (iii) accelerometer and strain gauge, switchable to the best in the local circumstances: or
    (iv) accelerometer and strain gauge sensors being combined to detect upward-only or downward-only signals.

The analysis thus far has simplified the situation in that we have assumed that there is only one significant reflecting interface—that being the bearing position 210. In many practical situations we could find several reflecting surfaces with arbitrary phase shifts with respect to the signals at the position of the receiver 200, thereby complicating the optimal choice of accelerometer and strain gauge. In such circumstances one can add the combination of accelerometer and strain gauge with variable amplitudes and phases in order to extract the best detected signal available. For instance, one could train the receiver 200 by applying all options in the amplitude/phase space available and settling upon the combination that was seen to be optimum. Such a training sequence could be undertaken manually by the operator or automatically via the controller 608.

So far we have described the receiver 200 as pertaining only surface equipment, thus opting to preferentially choose to detect signals that originate from below the receiver 200. Thus upwaves 202 would normally be detected by the receiver 200, with the benefit of rejecting downwaves 204 that could include deleterious noise signals originating from drive circuitry above the receiver 200. An alternate embodiment can be considered to detect signals downhole, at telemetry nodes disposed at intervals along the drill string. The ability to detect upwaves 202 and reject downwaves 204 or vice versa now has further benefits:
  (a) Control signals originating at surface can be preferentially detected and passed on from node to deeper node, without the complication of simultaneous upwaves 202, with corresponding benefits in interference, or noise rejection.
  (b) Telemetry signals originating from below can be preferentially detected and passed on from node to upper node, without the complication of simultaneous downwaves or noise, with corresponding benefits in interference or noise rejection.
  (c) Nodes adjacent to a given node can assess the signal quality pertinent to the given node and thereby help in maintaining an adequate signal-to-noise operating environment,
  (d) Because payload space in downhole telemetry tools is often at a premium, co-locating two gauges as described is relatively straightforward compared with the alternative approach of incorporating two similar gauges as a phased array, this latter option preferably requiring axial spacing of a quarter wavelength (about 2 m in typical operating circumstances).

In an additional embodiment, more than two phase-quadrature sensors could be beneficially applied to offset deleterious signal reflections, consistent with antenna diversity schemes.

While in an ideal environment the only reflection along the drill string occurs when the upwave 202 reflects at the bearing position 210, in a non-ideal, real-world environment both the upwaves 202 and downwaves 204 reflect at multiple points along the drill string, such as at the boundaries between different segments of drill pipe. Consequently, the strain and acceleration waves as measured by the receiver 200 at any one time may not be 90° offset in phase from each other as shown in FIG. 3. To compensate for non-idealities, the controller 608 is able to periodically sweep the phase of the strain signal relative to the acceleration signal to determine what relative phase difference between the two signals results in sufficient signal amplitude and quality. An example of a method for determining the magnitude of any of the overall acoustic wave, the upwave 202, and the downwave 204 from one or both of measured strain and acceleration is shown in FIG. 8.

Figure 8:
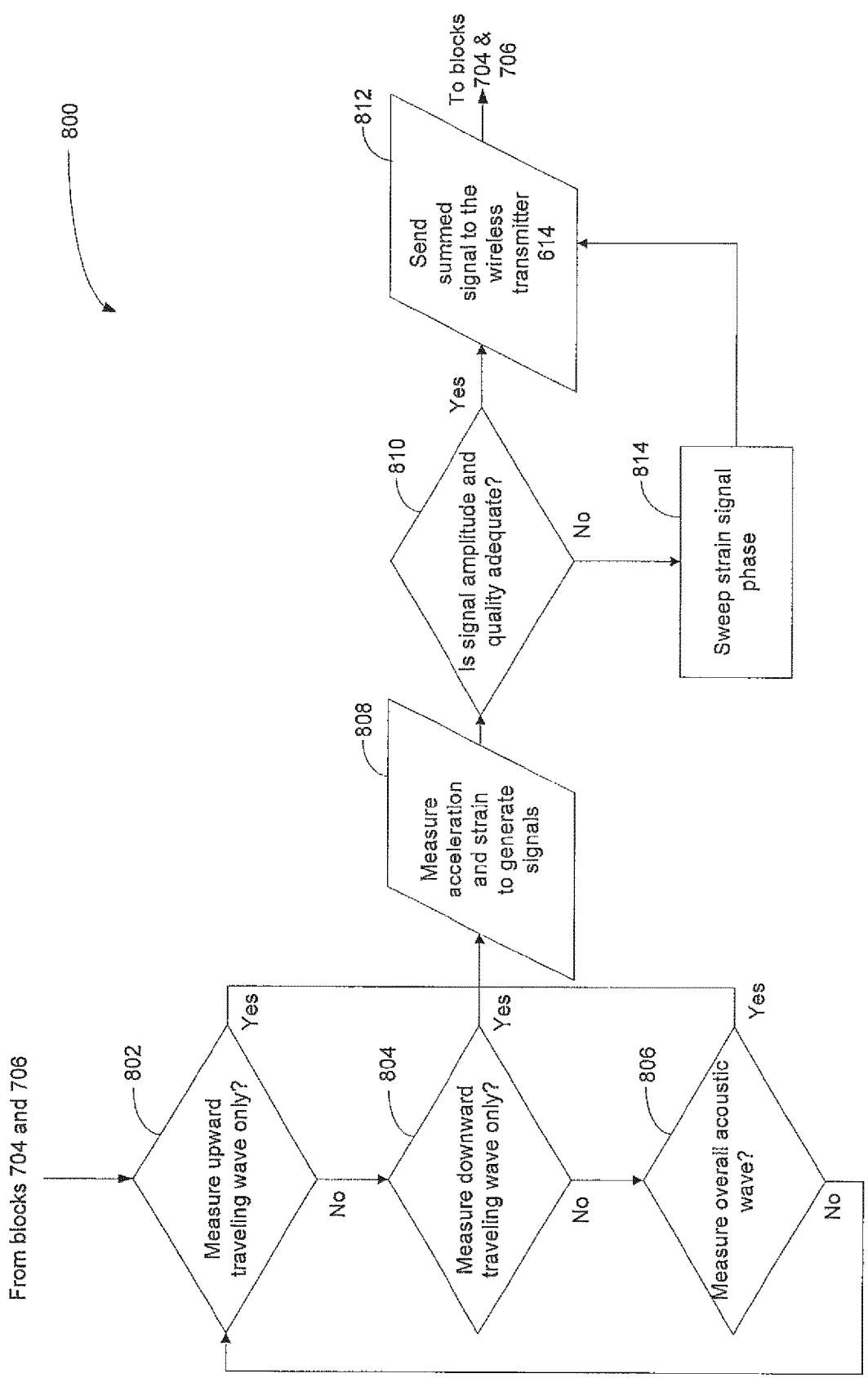

In FIG. 8, the controller 608 proceeds to block 802 from blocks 704 and 706 of FIG. 7. At blocks 802, 804, and 806, the controller 608 determines whether the operator wants to measure the upwave 202 only (block 802), the downwave 204 only (block 804), or the overall acoustic wave comprising the superposition of the upwave 202 and downwave 204 (block 806). The operator may wirelessly transmit instructions to the controller 608 via the safe area monitoring system 108 to instruct the controller 608 to measure a particular type of wave. Once the controller 608 determines which type of wave to measure, the controller 608 proceeds to block 808 where it measures acceleration and strain on the drill string using the accelerometer 601 and the strain gauge 400. As described above, the acceleration and strain signals are amplified, filtered, and digitized, following which the controller 608 can easily perform phase shifts on them by inserting time delays into one or both of the signals.

Following this signal acquisition, the controller 608 proceeds to block 610 where it determines whether the amplitude and quality of the signals are sufficient to determine the amplitude of the acoustic wave being measured. If signal amplitude and quality are sufficient, the controller 608 sums the acceleration and strain signals together and proceeds to block 812, where it transmits the cumulative signal to the safe area monitoring system 108 via the wireless transmitter 812.

If signal amplitude and quality are insufficient, the controller 608 proceeds to block 814 where it sweeps the phase of the strain signal from 0° to 360° to determine which phase results in the sum of the acceleration and strain signals being maximized. For example, when the controller determines that it is to measure the overall acoustic wave and proceeds to block 808 from block 806, the controller 608 may determine by sweeping the phase of the strain signal relative to the acceleration signal that the strain signal lags the acceleration signal by 65° instead of by 90° as it does in an ideal situation, and consequently that the cumulative signal is highest when the strain signal is shifted forward in time by 15°. The operator may calibrate the receiver 200 by sending a known calibration signal along the drill string, such as a pulse train, which the receiver 200 then uses to determine how much the phases of the signals are to be shifted to increase one or both of the amplitude and quality of the cumulative signal. Calibration may be done, for example, periodically every few minutes, or after the drill string is lengthened or shortened.

As another example, when the controller determines that it is to measure the upwave 202 or downwave 204 and proceeds to block 808 from either of blocks 802 and 804, in an ideal situation the controller 608 implements Equation 14 (for the upwave 202) or Equation 15 (for the downwave 204) and uses a version of the acceleration signal and a version of the strain signal shifted forward in time by 90° to determine the acceleration of the upwave 202 or downwave 204. However, the controller 608 may determine by sweeping the phase of the strain signal relative to the acceleration signal that the strain signal lags the acceleration signal by 65° instead of by 90° as it does in an ideal situation, and consequently that to determine the acceleration of the upwave 202 or downwave 204 the controller 608 should shift the strain signal forward in time by 65°.

After the controller 608 has swept phases at block 814, it determines the cumulative signal by summing the strain and acceleration signs and then transmits the cumulative signal to the safe area monitoring system 108 via the wireless transmitter (block 812). After transmission, the controller 608 proceeds back to blocks 704 and 706 to again perform the method 700 of FIG. 7.

Because the acceleration and strain signals are digitized, the controller 608 is also able to perform additional processing on the signals, over and above performing the method 700 described above. For example, the controller 603 may use digital signal processing techniques to condition the signals according to preset criteria, such as to increase signal amplitude, reduce distortion, and perform digital filtering.

While the description of the acoustic receiver 200 is in the context of use on the drilling rig 100, it is to be understood that the detector may also be attached to a service rig, slant rig, well head, or other surface equipment associated with boreholes in the earth. The receiver 200 may also be used below the surface, such as in an acoustic repeater.

The foregoing embodiments describe using the acoustic receiver 200 in conjunction with acoustic telemetry. In alternative embodiments (not depicted), however, the acoustic receiver 200 may also be used as a receiver or a repeater in conjunction with mud pulse telemetry. In mud pulse telemetry, pressure waves are transmitted via drilling mud that is pumped through the drill string. As the pressure waves move axially along the drill strong, the Poisson effect causes the drill string to expand and contract radially. The acoustic receiver 200 can detect this radial expansion and compression analogously to how the receiver 200 measures the acoustic waves in the depicted embodiments, and from them measure the pressure wave propagating along the drilling mud.

The controller used in the foregoing embodiments may be, for example, a microprocessor, microcontroller, digital signal processor, programmable logic controller, field programmable gate array, or an application-specific integrated circuit. Examples of the computer readable medium are non-transitory and include disc-based media such as CD-ROMs and DVDs, magnetic media such as hard drives and other forms of magnetic disk storage, semiconductor based media such as flash media, random access memory, and read only memory.

It is contemplated that any part of any aspect or embodiment discussed in this specification can be implemented or combined with any part of any other aspect or embodiment discussed in this specification.

For the sake of convenience, the exemplary embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A method for measuring an acoustic wave propagating along a drill string, the method comprising:
(a) measuring with a first sensor axial acceleration of the drill string at a first location along the drill string;
(b) measuring with a second sensor axial strain of the drill string at a second location along the drill string, wherein magnitudes of the acceleration and strain vary in proportion to magnitude of the acoustic wave and wherein the acceleration and strain have a quadrature phase relationship; and
(c) determining the magnitude of the acoustic wave from one or both of the acceleration and strain,
wherein the first and second locations are separated by a distance other than n·(λ/4), wherein n is an odd integer excluding zero and excluding odd integers that would result in one or both of the first and second locations being off the drill string, and wherein λ is a wavelength of the acoustic wave.

2. The method of claim 1 wherein a combination of the acceleration and strain is used to determine the magnitude of the acoustic wave.

3. The method of claim 1 wherein a piezoelectric transducer is used to measure the strain.

4. The method of claim 1 wherein measuring the strain generates a strain signal, and further comprising amplifying the strain signal prior to determining the magnitude of the acoustic wave.

5. The method of claim 1 wherein measuring the acceleration generates an acceleration signal, and further comprising amplifying the acceleration signal prior to determining the magnitude of the acoustic wave.

6. The method of claim 5 further comprising conditioning and digitizing the strain and acceleration signals prior to determining the magnitude of the acoustic wave.

7. The method of claim 5 wherein determining the magnitude of the acoustic wave comprises summing the strain and acceleration signals.

8. The method of claim 7 further comprising, prior to summing the strain and acceleration signals:
(a) sweeping the signals relative to each other and determining a phase difference between the signals at which a sum of the signals is maximized; and
(b) shifting the signals together by the phase difference.

9. The method of claim 6 wherein the acoustic wave is an overall acoustic wave comprising a superposition of an upward traveling wave and a downward traveling wave.

10. The method of claim 9 further comprising determining current acceleration of the upward traveling wave by summing a linear combination of the acceleration signal sampled at time t and the strain signal sampled at time t−T/4, where T is the period of the acoustic wave.

11. The method of claim 9 further comprising determining current acceleration of the upward traveling wave by subtracting a linear combination of the acceleration signal sampled at time t and the strain signal sampled at time t−T/4, where T is the period of the acoustic wave.

12. The method of any one of claim 1 wherein the first and second locations are located within a downhole telemetry node.

13. An acoustic receiver for use on a drill string to measure an acoustic wave propagating along the drill string, the receiver comprising:
(a) a housing attachable to the drill string;
(b) a first sensor mounted within the housing for measuring axial acceleration at a first location on the drill string and for generating an acceleration signal representative of the acceleration;
(c) a second sensor mounted within the housing for measuring axial strain at a second location on the drill string and for generating a strain signal representative of the strain, wherein magnitudes of the acceleration and strain vary in proportion to magnitude of the acoustic wave and wherein the acceleration and strain have a quadrature phase relationship; and
(d) a controller mounted within the housing and communicatively coupled to the first and second sensors, the controller configured to combine the acceleration and strain signals to determine the magnitude of the acoustic wave,
wherein the first and second locations are separated by a distance other than n·(λ/4), wherein n is an odd integer excluding zero and excluding odd integers that would result in one or both of the first and second locations being off the drill string, and wherein λ is a wavelength of the acoustic wave.

14. The receiver of claim 13 wherein the controller is configured to use a combination of the acceleration and strain to determine the magnitude of the acoustic wave.

15. The receiver of claim 13 wherein the second sensor comprises a piezoelectric transducer.

16. The receiver of claim 13 wherein measuring the strain generates a strain signal, and further comprising a strain amplifier, communicative with the controller and the piezoelectric transducer, to amplify the strain signal.

17. The receiver of any one of claim 13 wherein the first sensor comprises an accelerometer and measuring the acceleration generates an acceleration signal, and further comprising an acoustic amplifier, communicative with the controller and the accelerometer, to amplify the acceleration signal.

18. The receiver of claim 17 further comprising signal conditioning circuitry, communicative with the amplifiers and the controller, to condition and digitize the strain and acceleration signals.

19. The receiver of claim 17 wherein determining the magnitude of the acoustic wave comprises summing the strain and acceleration signals.

20. The receiver of claim 19 wherein the controller is configured, prior to summing the strain and acceleration signals, to:
(a) sweep the signals relative to each other and determining a phase difference between the signals at which a sum of the signals is maximized; and
(b) shift the signals together by the phase difference.

21. The receiver of claim 18 wherein the acoustic wave is an overall acoustic wave comprising a superposition of an upward traveling wave and a downward traveling wave.

22. The receiver of claim 21 wherein the controller is configured to determine current acceleration of the upward traveling wave by summing a linear combination of the acceleration signal sampled at time t and the strain signal sampled at time t−T/4, where T is the period of the acoustic wave.

23. The receiver of claim 21 wherein the controller is configured to determine current acceleration of the upward traveling wave by subtracting a linear combination of the acceleration signal sampled at time t and the strain signal sampled at time t−T/4, where T is the period of the acoustic wave.

24. The receiver of claim 13 wherein the housing comprises threaded ends that can be screwed into the drill string for use as a downhole telemetry node.

25. A non-transitory computer readable medium having encoded thereon statements and instructions that, when executed by a controller, cause the controller to perform a method for measuring an acoustic wave propagating along a drill string, the method comprising:
(a) measuring with a first sensor axial acceleration of the drill string at a first location along the drill string;
(b) measuring with a second sensor axial strain of the drill string at a second location along the drill string, wherein magnitudes of the acceleration and strain vary in proportion to magnitude of the acoustic wave and wherein the acceleration and strain have a quadrature phase relationship; and
(c) determining the magnitude of the acoustic wave from one or both of the acceleration and strain,
wherein the first and second locations are separated by a distance other than n·(λ/4), wherein n is an odd integer excluding zero and excluding odd integers that would result in one or both of the first and second locations being off the drill string, and wherein $\lambda$ is a wavelength of the acoustic wave.

26. The method of claim 1, wherein n is an odd integer or zero.

27. The receiver of claim 13, wherein n is an odd integer or zero.

28. The non-transitory computer readable medium of claim 25, wherein n is an odd integer or zero.

* * * * *